(12) United States Patent
Yang et al.

(10) Patent No.: US 12,387,494 B2
(45) Date of Patent: Aug. 12, 2025

(54) METHOD FOR WAREHOUSE STORAGE-LOCATION MONITORING, COMPUTER DEVICE, AND NON-VOLATILE STORAGE MEDIUM

(71) Applicant: VisionNav Robotics USA Inc., Acworth, GA (US)

(72) Inventors: Bingchuan Yang, Guangdong (CN); Yujie Lu, Guangdong (CN); Mu Fang, Guangdong (CN); Luyang Li, Guangdong (CN); Peng Chen, Guangdong (CN)

(73) Assignee: VisionNav Robotics USA Inc., Acworth, GA (US)

( * ) Notice: Subject to any disclaimer, the term of this patent is extended or adjusted under 35 U.S.C. 154(b) by 332 days.

(21) Appl. No.: 17/855,872

(22) Filed: Jul. 1, 2022

(65) Prior Publication Data

US 2023/0007831 A1    Jan. 12, 2023

(30) Foreign Application Priority Data

Jul. 7, 2021  (CN) .......................... 202110769235.7

(51) Int. Cl.
*G06V 20/52*     (2022.01)
*G06Q 10/08*    (2024.01)
(Continued)

(52) U.S. Cl.
CPC ............. *G06V 20/52* (2022.01); *G06Q 10/08* (2013.01); *G06T 3/40* (2013.01); *G06V 10/40* (2022.01);
(Continued)

(58) Field of Classification Search
CPC ...... G06V 20/52; G06V 10/40; G06V 10/774; G06V 20/41; G06V 20/46; G06V 20/48;
(Continued)

(56) References Cited

U.S. PATENT DOCUMENTS

2010/0040285 A1   2/2010   Csurka et al.
2011/0320322 A1   12/2011   Roslak et al.
(Continued)

FOREIGN PATENT DOCUMENTS

CA   2481250 C  *  9/2011   ............... G07C 9/00
CN   110532978 A    12/2019
(Continued)

OTHER PUBLICATIONS

KR1020220081351—Request for the Submission of an Opinion mailed on Aug. 29, 2024, 18 pages.
(Continued)

*Primary Examiner* — Sumati Lefkowitz
*Assistant Examiner* — Connor L Hansen
(74) *Attorney, Agent, or Firm* — Getech Law LLC; Jun Ye

(57) ABSTRACT

The disclosure relates to a method for warehouse storage-location monitoring, a computer device, and a storage medium. The method includes the following. Video data of a warehouse storage-location area is obtained, and a target image corresponding to the warehouse storage-location area is obtained based on the video data, where the warehouse storage-location area includes an area of a storage-location and an area around the storage-location. The target image is detected based on a category detection model, to determine a category of each object appearing in the target image. A detection result is obtained by detecting a status of each object based on the category of each object. The detection result is transmitted to a warehouse scheduling system, where the detection result is used for the warehouse scheduling system to monitor the warehouse storage-location area.

17 Claims, 9 Drawing Sheets

(51) Int. Cl.

| | |
|---|---|
| *G06T 3/40* | (2024.01) |
| *G06V 10/40* | (2022.01) |
| *G06V 10/774* | (2022.01) |
| *G06V 20/40* | (2022.01) |
| *G06V 40/10* | (2022.01) |
| *G08B 21/18* | (2006.01) |
| *H04N 7/18* | (2006.01) |

(52) U.S. Cl.
CPC ............ *G06V 10/774* (2022.01); *G06V 20/41* (2022.01); *G06V 20/46* (2022.01); *G06V 20/48* (2022.01); *G08B 21/18* (2013.01); *H04N 7/183* (2013.01); *G06V 40/10* (2022.01); *G06V 2201/07* (2022.01); *G06V 2201/08* (2022.01)

(58) Field of Classification Search
CPC ............... G06V 40/10; G06V 2201/07; G06V 2201/08; G06V 10/30; G06V 10/764; G06Q 10/08; G06Q 10/087; G06Q 10/06312; G06Q 50/10; G06T 3/40; G06T 7/11; G06T 7/70; G06T 2207/10016; G08B 21/18; G08B 13/19602; G08B 21/182; H04N 7/183
See application file for complete search history.

(56) References Cited

U.S. PATENT DOCUMENTS

| | | |
|---|---|---|
| 2014/0267776 A1 | 9/2014 | Duthu |
| 2016/0373734 A1 | 12/2016 | Cole et al. |
| 2019/0019285 A1 | 1/2019 | Matsumoto et al. |
| 2019/0205694 A1 * | 7/2019 | Wang .................. G06V 40/165 |

FOREIGN PATENT DOCUMENTS

| | | | |
|---|---|---|---|
| CN | 110929626 | A | 3/2020 |
| CN | 111311630 | A | 6/2020 |
| CN | 112001228 | A | 11/2020 |
| CN | 112307786 | A | 2/2021 |
| CN | 112418764 | A | 2/2021 |
| CN | 113065817 | A | 7/2021 |
| EP | 2974831 | A2 | 1/2016 |
| JP | 2008265909 | A | 11/2008 |
| JP | 2021089569 | A | 6/2021 |
| KR | 101725347 | B1 | 4/2017 |
| KR | 20170126602 | A | 11/2017 |
| KR | 20180054585 | A | 5/2018 |
| WO | WO-2020132535 | A1 * | 6/2020 .......... B65G 1/0421 |

OTHER PUBLICATIONS

EP22182621.7—Communication pursuant to Article 94(3) mailed on Jul. 23, 2024, 6 pages.
Wikipedia, "Downsampling(signal processing)—Wikipedia," retrieved from the Internet: https://en.wikipedia.org/w/index.php?title=Downsampling_(signal_processing)&oldid=1024415173, May 22, 2021, 6 pages.
EPO, Extended European Search Report for corresponding European Patent Application No. 22182621.7, Nov. 18, 2022, 9 pages.
EP22182621.7—Communication pursuant to Article 94(3) mailed on Oct. 17, 2023, 9 pages.
JP2022108074—Notice of Reasons for Refusal mailed on May 17, 2023, 8 pages.
CN202110769235.7—Office Action mailed on Apr. 21, 2025, 12 pages.
CN202110769235.7—Office Action mailed on Apr. 21, 2025, 12 pages.

* cited by examiner

METHOD FOR WAREHOUSE STORAGE-LOCATION MONITORING, COMPUTER DEVICE, AND NON-VOLATILE STORAGE MEDIUM

CROSS-REFERENCE TO RELATED APPLICATIONS

This application claims priority under 35 U.S.C. § 119(a) to Chinese Patent Application No. 202110769235.7 filed on Jul. 7, 2021, the entire disclosure of which is incorporated herein by reference.

TECHNICAL FIELD

This disclosure relates to the field of warehouse storage-location management technology, and in particular, to a method for warehouse storage-location monitoring, a computer device, and a non-volatile storage medium.

BACKGROUND

With development of warehouse storage-location management technology, scenarios in a warehouse are getting more complex, that is, there are scenarios where multiple objects such as forklifts, staff members, goods, or the like are mixed, so that a laser sensor is usually used to monitor warehouse storage-locations, thereby realizing management for the warehouse storage-locations.

However, using the laser sensor can only monitor whether goods are in the warehouse storage-locations but cannot distinguish categories of detected objects, resulting in increase of false detection events and low accuracy of warehouse storage-location identification.

SUMMARY

A method for warehouse storage-location monitoring is provided. The method includes the following. Video data of a warehouse storage-location area is obtained, and a target image corresponding to the warehouse storage-location area is obtained based on the video data, where the warehouse storage-location area includes an area of a storage-location and an area around the storage-location. The target image is detected based on a category detection model, to determine a category of each object appearing in the target image, where the category includes at least one of: human, vehicle, or goods. A detection result is obtained by detecting a status of each object based on the category of each object, where the detection result includes at least one of: whether the human enters the warehouse storage-location area, vehicle status information, or storage-location inventory information. The detection result is transmitted to a warehouse scheduling system, where the detection result is used for the warehouse scheduling system to monitor the warehouse storage-location area.

A computer device is provided. The computer device includes a processor and a memory configured to store computer programs which, when executed by the processor, enable the processor to implement the method for warehouse storage-location monitoring above.

A non-volatile computer-readable storage medium is provided. The non-volatile computer-readable storage medium is configured to store computer programs which, when executed by a processor, enable the processor to implement the method for warehouse storage-location monitoring above.

DETAILED DESCRIPTION

In order to make the purposes, technical solutions, and advantages of the present disclosure clearer, the following will describe the present disclosure in detail with a combination of accompanying drawings and implementations. It should be understood that, specific implementations described herein are merely for explaining, rather than limiting, the present disclosure.

Figure 1:
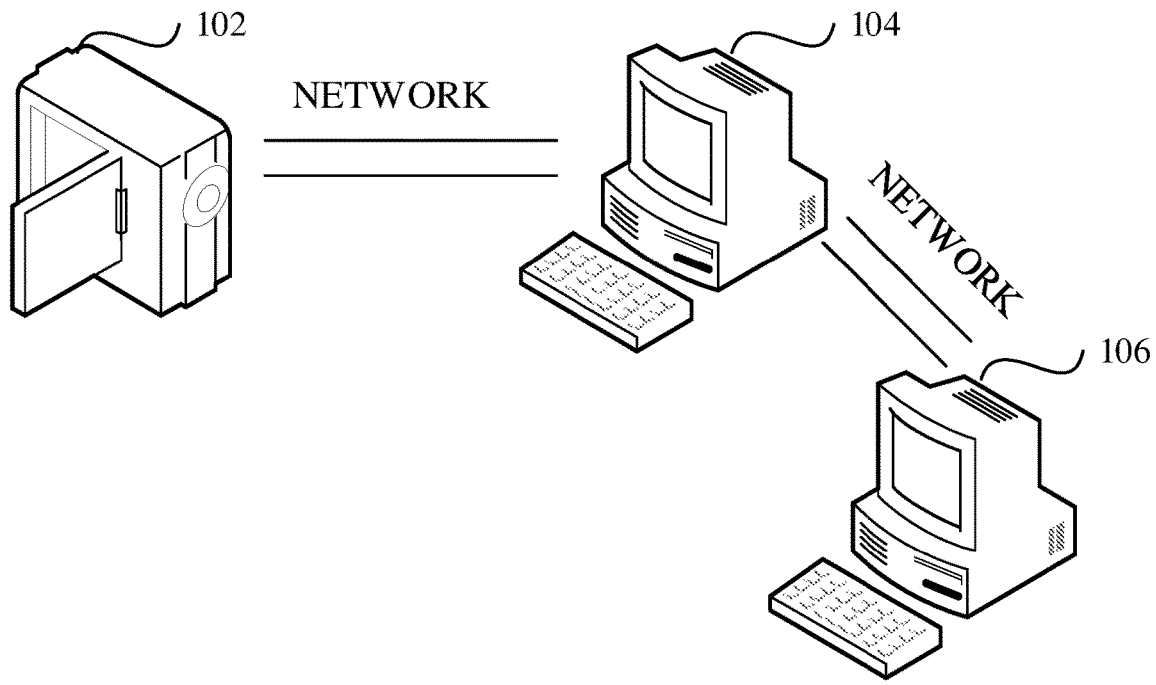
FIG. 1 is a diagram illustrating an environment where a method for warehouse storage-location monitoring in an implementation is applied.

A method for warehouse storage-location monitoring provided in the disclosure can be applied to an environment illustrated in FIG. 1. A photographing device 102 communicates with a computer device 104 via a network. The photographing device 102 obtains video data by photographing a warehouse storage-location area, and then transmits the video data to the computer device 104. The computer device 104 obtains the video data, and obtains a target image corresponding to the warehouse storage-location area based on the video data. The computer device 104 detects the target image based on a category detection model, to determine a category of each object appearing in the target image. The computer device 104 obtains a detection result by detecting a status of each object based on the category of each object. The computer device 104 transmits the detection result to a warehouse scheduling system 106, to enable the warehouse scheduling system 106 to monitor the warehouse storage-location. The photographing device 102 may be but is not limited to various video collecting apparatuses, e.g., a high definition (HD) camera, a vision sensor, or a phone with a photographing function. The computer device 104 may specifically be a terminal or a server, where the terminal may be but is not limited to various personal computers, notebook computers, smart phones, tablet computers, or portable wearable devices, and the server may be implemented by an independent server or a server cluster composed of multiple servers. The warehouse scheduling system 106 is a robot control system (RCS), also called a central control scheduling system, and is mainly used for robot scheduling. The warehouse scheduling system 106 may specifically be a terminal or a server, where the terminal may be but is not limited to various personal computers, notebook computers, smart phones, tablet computers, or portable wearable devices, and the server may be implemented by an independent server or a server cluster composed of multiple servers.

Figure 2:
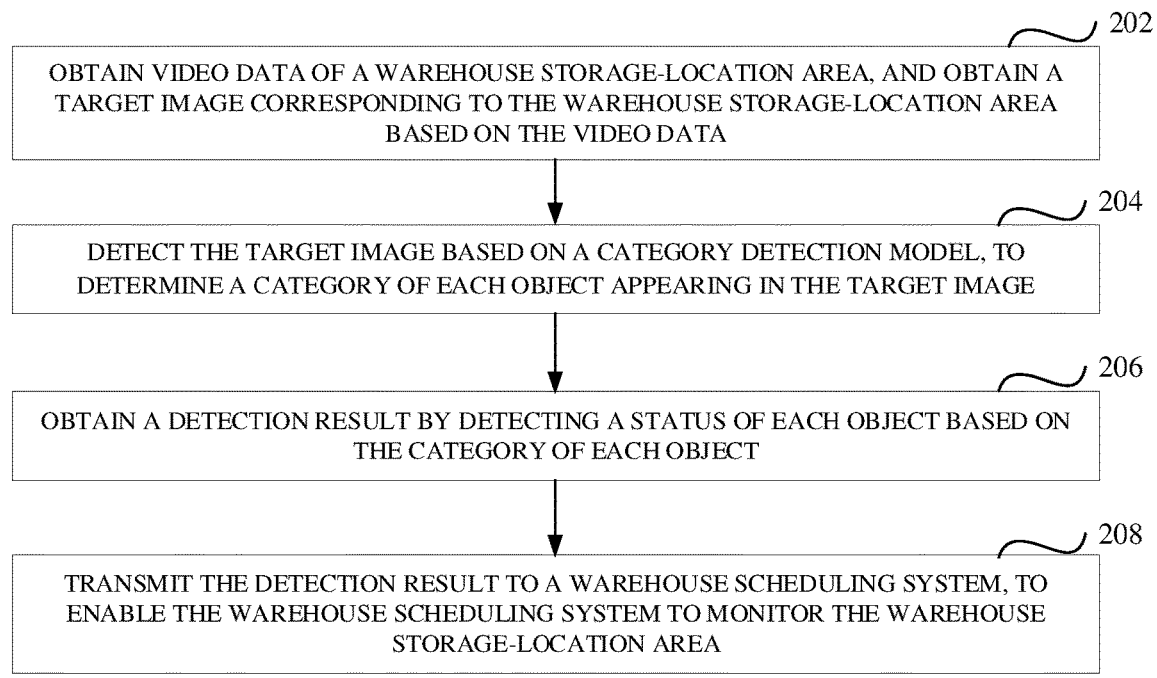
FIG. 2 is a schematic flow chart illustrating a method for warehouse storage-location monitoring in an implementation.

In an implementation, as illustrated in FIG. 2, a method for warehouse storage-location monitoring is provided. The method applied to the computer device in FIG. 1 is taken as an example for illustration. The method includes following operations.

At block 202, video data of a warehouse storage-location area is obtained, and a target image corresponding to the warehouse storage-location area is obtained based on the video data, where the warehouse storage-location area includes an area of a storage-location and an area around the storage-location.

The area of the storage-location may be a warehousing storage area, and the area around the storage-location may be a platform loading-and uploading area. The photographing device can use a few low-cost vision sensors. The area around the storage-location is an area with an adjustable position relative to the area of the storage-location, and an adjustable range of the position of the area around the storage-location is in a preset range. The area around the storage-location is also called a safe area. A size of the area around the storage-location can be flexibly set, i.e., area parameters such as a position of the area around the storage-location relative to the warehouse storage-location area, a shape and area of the area around the storage-location, or the like each can be flexibly and manually set according to actual conditions, or can be automatically set by the computer device 104 according to previous data of the area around the storage-location. The area around the storage-location is the area with the adjustable position relative to the area of the storage-location, such that the area around the storage-location can better adapt to different application scenarios, e.g., different positions of the area around the storage-location relative to the area of the storage-location can be set according to overall space sizes of different warehouses, can also be set according to risk factors of different goods, or the like, thereby improving intelligence and universality of warehouse storage-location monitoring.

Specifically, the photographing device 102 obtains the video data of the warehouse storage-location area by performing video monitoring on the warehouse storage-location area, and transmits the video data to the computer device 104 through a switchboard. The computer device 104 receives the video data of the warehouse storage-location area, and obtains the target image corresponding to the warehouse storage-location area based on the video data.

In an implementation, the photographing device 102 and the computer device 104 realize video flow (video data) transmission through the switchboard, where the photographing device 102 and the switchboard can realize a data flow through a wired network, and the switchboard and the computer device 104 can realize a data flow through the wired network or a mobile communication technology (e.g., $5^{th}$ generation (5G) mobile communication technology).

In an implementation, the video data of the warehouse storage-location area is obtained in real time based on photographing devices deployed at the warehousing storage area and the platform loading-and-uploading area. The video data is transmitted to the switchboard through the wired network. Monitoring programs of the computer device continuously obtain a video flow based on the switchboard, and the computer device obtains the target image corresponding to the warehouse storage-location area based on the video flow. The photographing devices each may be a camera with an infrared function, such that the photographing device can still perform real-time detection tasks without lighting and provide information support for intelligent devices that work at night, decreasing operating costs, which is extremely suitable in various scenarios such as platform warehousing, goods transshipment, or the like in warehousing logistics, manufacturing, aviation, or other fields.

At block 204, the target image is detected based on a category detection model, to determine a category of each object appearing in the target image, where the category includes at least one of: human, vehicle, or goods.

Specifically, the computer device inputs the obtained target image to the category detection model for detection, and obtains a detection result by classifying each object appearing in the target image according to the category of each object. For example, the computer device inputs the target image to the category detection model, where each object appearing in the target image is classified with the category detection model according to the categories including the human, the vehicle, or the goods, and the computer device obtains the category of each object appearing in the target image.

At block 206, a detection result is obtained by detecting a status of each object based on the category of each object, where the detection result includes at least one of: whether the human enters the warehouse storage-location area, vehicle status information, or storage-location inventory information.

The storage-location inventory information includes whether the storage-location is occupied or categories of goods at the storage-location.

Specifically, the computer device obtains the detection result corresponding to the status of each object by detecting the status of each object based on a state evaluation module according to detection manners corresponding to the categories. For example, the computer device obtains the detection result corresponding to the status of each object by detecting the status of each object through the state evaluation module according to the detection manners corresponding to the categories, where the detection result for example includes a status of the human in the area of the storage-location, a status of the vehicle, whether goods are in the area of storage-location, or categories of goods in the area of storage-location, thereby realizing a function of intelligent sorting according to categories of goods.

At block 208, the detection result is transmitted to a warehouse scheduling system, to enable the warehouse scheduling system to monitor the warehouse storage-location area.

The warehouse scheduling system is an RCS, also called a central control scheduling system, and is mainly used for robot scheduling.

Specifically, the computer device transmits the detection result to the RCS, and the RCS performs schedule for the warehouse storage-location area based on the detection result. For example, the computer device can perform network connection with the RCS through wireless fidelity (WiFi) or 5G, and transmits the detection result to the RCS through a hypertext transfer protocol (HTTP) and javascript object notation remote procedure call (JSON_RPC), to indicate actions of a warehouse unmanned forklift.

In the above method for warehouse storage-location monitoring, the video data of the warehouse storage-location area is obtained first, and the target image corresponding to the warehouse storage-location area is obtained based on the video data, such that with deep-learning image recognition technology, the target image is detected through the category detection model, which can accurately and efficiently identify an object such as human, vehicle, or goods appearing in the warehouse, and the detection result is obtained by detecting the status of each object. Finally, the detection result is shared in real time to the warehouse scheduling system, thereby realizing real-time monitoring for warehouse storage-locations and greatly improving accuracy of warehouse storage-location identification. In addition, the detection result detected in the disclosure is shared in real time to a warehouse scheduling system of a user, which can provide storage-location security information to companies and can also assist in unmanned operations of an auxiliary intelligent device such as an inspection robot, or the like.

Figure 3:
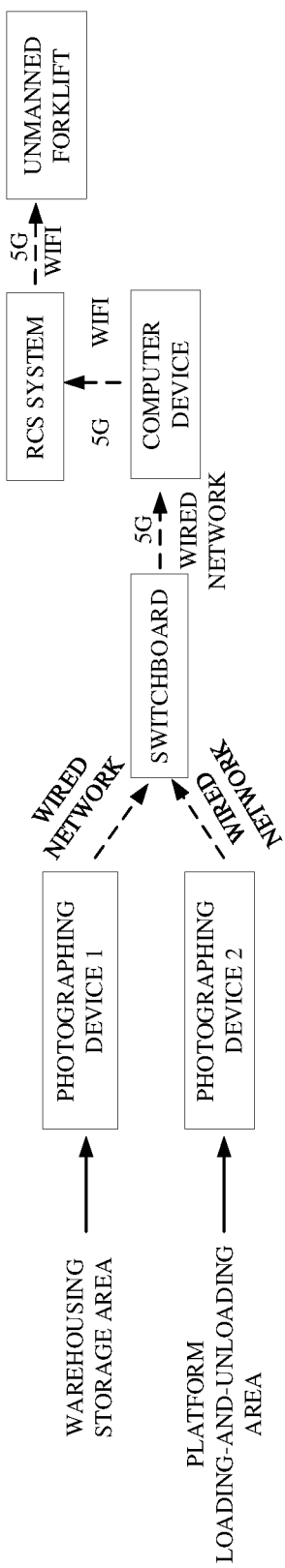
FIG. 3 is a diagram illustrating a scenario where a method for warehouse storage-location monitoring in an implementation is used.

In an optional implementation, as illustrated in FIG. 3, the photographing device obtains video data corresponding to the warehousing storage area and a platform loading-and-unloading area respectively, and transmits the video data to the switchboard through the wired network. The switchboard can transmit the video data to the computer device through the wired network or 5G technology. The monitoring programs of the computer device continuously obtain a video flow, and based on the video flow, the computer device obtains target images corresponding to the warehousing storage area and the platform loading-and-unloading area. The computer device obtains a category of each object appearing in each of the target images through a category detection model based on the target images. The computer device obtains a detection result corresponding the category based on the category of each object and a detection manner corresponding to the category. The computer device can perform network connection with the RCS through the 5G technology or WiFi, and transmit the detection result to the RCS through HTTP and JSON_RPC, to indicate actions of a warehouse unmanned forklift. The RCS can be connected with the unmanned forklift through the 5G technology or WiFi, thereby realizing real-time monitoring for warehouse storage-locations and improving accuracy of warehouse storage-location identification.

Figure 4:
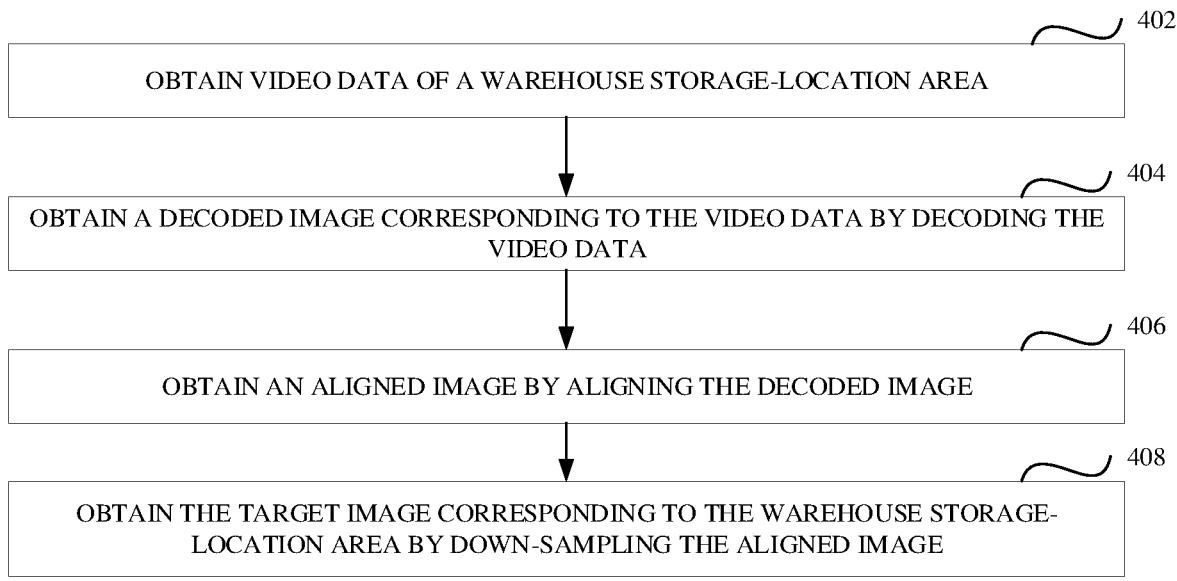
FIG. 4 is a schematic flow chart illustrating obtaining of a target image in an implementation.

In an implementation, as illustrated in FIG. 4, the video data of the warehouse storage-location area is obtained, and the target image corresponding to the warehouse storage-location area is obtained based on the video data as follows.

At block 402, the video data of the warehouse storage-location area is obtained.

Specifically, the monitoring programs of the computer device continuously obtain a video flow of the warehouse storage-location area through the switchboard. For example, a storage-location detection camera inputs the video data of the warehouse storage-location area to an image processing module of the computer device, where the image processing module is used for image collection and pre-processing.

At block 404, a decoded image corresponding to the video data is obtained by decoding the video data.

Specifically, after the computer device inputs the video data to the image processing module, the video data is decoded, and then the decoded image corresponding to the video data is obtained.

At block 406, an aligned image is obtained by aligning the decoded image.

Specifically, different photographing devices correspond to different models, resulting in distortion of the decoded image. The computer device obtains the aligned image by adjusting a distorted area of the decoded image through parameter adjustment.

At block 408, the target image corresponding to the warehouse storage-location area is obtained by down-sampling the aligned image.

Specifically, the computer device obtains the target image corresponding to the warehouse storage-location area by down-sampling the aligned image, thereby reducing a calculation amount of the target image, and the computer device stores the video data of the warehouse storage-location area.

In the implementation, the computer device obtains the video data of the warehouse storage-location area, and obtains the decoded image by decoding based on the video data, realizing a procedure of converting a video into an image. The computer device obtains the aligned image by aligning the decoded image, thereby solving image distortion due to different photographing devices. The computer device then obtains the target image by down-sampling the aligned image, to reduce the calculation amount of the target image.

In an implementation, the target image is detected based on the category detection model, to determine the category of each object appearing in the target image as follows. A trained category detection model is obtained. An image feature corresponding to the target image is obtained by performing feature extraction on the target image based on the category detection model. The category of each object appearing in the target image is determined according to the image feature.

Specifically, the computer device loads the trained category detection model and inputs the target image to the category detection model for feature extraction, after the computer device obtains the target image corresponding to the warehouse storage-location area. The image feature corresponding to the target image is obtained after the category detection model completes forward calculation. Each object appearing in the target image is classified through the category detection model according to the image feature, to obtain the category of each object. The feature extraction includes, but is not limited to, extracting image features such as an edge feature, a color feature, a textural feature, a shape feature, or a spatial relationship feature of an image. The forward calculation is a procedure of calculating output according to a group of input. Specifically, the computer device inputs the obtained target image to a deep-learning object-detection-and-classification module, obtains a feature corresponding to the human, the vehicle, or the goods in the target image by loading a trained classification model in the deep-learning object-detection-and-classification module and performing forward calculation, and determines the category of each object in the target image through classifying according to the feature appearing in the target image.

In the implementation, the computer device obtains the image feature corresponding to the target image through the trained category detection model, and determines the category of each object appearing in the target image according to the image feature. Therefore, using a deep learning technology can reduce dependence on environments (e.g., a site, a surrounding, lighting, or the like), and can efficiently identify human, goods, or vehicle in the warehouse storage-location area, thereby realizing intelligent classification and improving accuracy of storage-location monitoring and identification.

Figure 5:
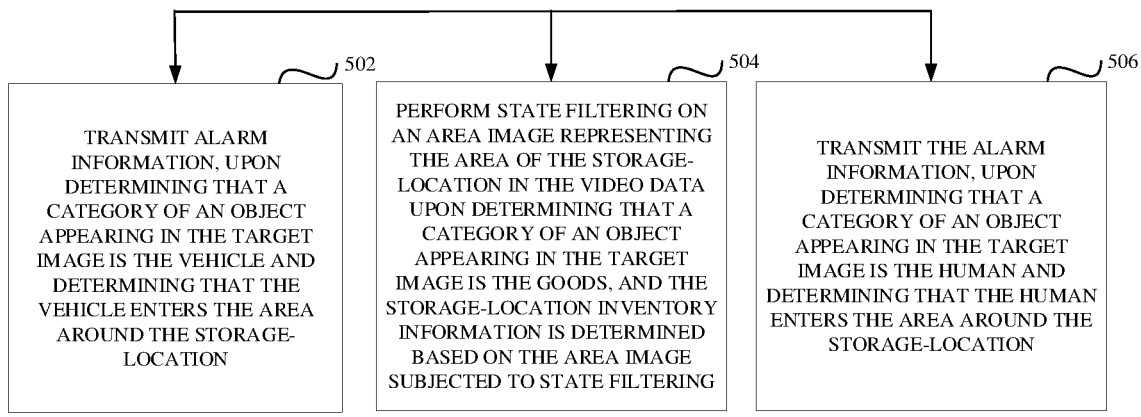
FIG. 5 is a schematic flow chart illustrating obtaining of a detection result in an implementation.

In an implementation, as illustrated FIG. 5, the detection result is obtained by detecting the status of each object based on the category of each object as follows.

At block 502, alarm information is transmitted, upon determining that a category of an object appearing in the target image is the vehicle and determining that the vehicle enters the area around the storage-location.

Specifically, the computer device detects the warehouse storage-location area based on a table for photographing device and storage-location allocation configuration. The table for photographing device and storage-location allocation configuration includes a correspondence between photographing device identifiers and storage-locations, where the photographing device identifier may include a product sequence number of a photographing device, or the like. The computer device transmits the alarm information, upon determining that the category of the object appearing in the target image is the vehicle and determining that the vehicle enters the area around the storage-location. The alarm information can be transmitted through an indicator light or a horn deployed in the warehouse storage-location area for alarm, can also be transmitted to a display interface of the computer device for alarm, or can also be transmitted to the RCS for alarm. For example, the computer device detects whether a vehicle enters the warehouse storage-location area. If the vehicle enters the warehouse storage-location area, the indicator light and the horn in the warehouse respectively alarm through sound and light, simultaneously, an alarm text is transmitted to the display interface of the computer device, and the alarm information is transmitted to the RCS, until the vehicle leaves the warehouse storage-location area. In another implementation, the alarm information is transmitted, upon determining that the category of the object appearing in the target image is the vehicle and determining that the vehicle enters the area of the storage-location. Alternatively, the alarm information is transmitted, upon determining that the category of the object appearing in the target image is the vehicle and determining that the vehicle enters the area of the storage-location and the area of the storage-location.

At block 504, state filtering is performed on an area image representing the area of the storage-location in the video data upon determining that a category of an object appearing in the target image is the goods, and the storage-location inventory information is determined based on a state filtering result.

Specifically, the computer device detects each storage-location based on the table for photographing device and storage-location allocation configuration. When the category is the goods, the computer device sets times of filtering and performs the multiple times of state filtering on the area image representing the area of the storage-location in the video data, to obtain state filtering results corresponding to the times of filtering, and determine the storage-location inventory information based on the state filtering results.

In an implementation, the computer device obtains the table for photographing device and storage-location allocation configuration through the state evaluation module, and detects each storage-location in the warehouse storage-location area. When the category is the goods, state filtering is performed on each area image representing the area of the storage-location in the video data, to obtain state filtering results corresponding to the number of filtering. Multiple comparing results are obtained by comparing a state filtering result of a previous area image with a state filtering result of a current area image based on each of the state filtering results corresponding to each area image, and the storage-location inventory information is determined based on the comparing results.

In an implementation, the computer device obtains the table for photographing device and storage-location allocation configuration through the state evaluation module, and detects each storage-location in the warehouse storage-location area. When the category is the goods, multiple times of state filtering are performed on the current area image based on the current area image representing the area of the storage-location in the video data, to obtain state filtering results corresponding to the times of filtering. Multiple comparing results are obtained by comparing a previous state filtering result of the current area image with a current state filtering result of the current area image, and the storage-location inventory information is determined based on the comparing results.

At block 506, the alarm information is transmitted, upon determining that a category of an object appearing in the target image is the human and determining that the human enters the area around the storage-location.

Specifically, the computer device transmits the alarm information, upon determining that the category of the object appearing in the target image is the human and determining that the human enters the area around the storage-location. The alarm information can be transmitted through the indicator light or the horn deployed in the warehouse storage-location area for alarm, can also be transmitted to the display interface of the computer device for alarm, or can also be transmitted to the RCS for alarm. For example, when the computer device determines that the category of the object appearing in the target image is the human and determines that the human enters the area around the storage-location, the horn and the indicator light in the warehouse alarm respectively through sound and light, simultaneously, the alarm text is transmitted to the display interface of the computer device, and the alarm information is transmitted to the RCS, until the human leaves the warehouse storage-location area. In another implementation, the alarm information is transmitted, upon determining that the category of the object appearing in the target image is the human and determining that the human enters the area of the storage-location. Alternatively, the alarm information is transmitted, upon determining that the category of the object appearing in the target image is the human and determining that the human enters the area of the storage-location and the area of the storage-location.

In the implementation, the alarm information is transmitted, upon determining that the category of the object appearing in the target image is the vehicle and determining that the vehicle enters the area around the storage-location. State filtering is performed on the area image representing the area of the storage-location in the video data upon determining that the category of the object appearing in the target image is the goods, and the storage-location inventory information is determined based on the state filtering results. The alarm information is transmitted, upon determining that the category of the object appearing in the target image is the human and determining that the human enters the area around the storage-location. Therefore, detecting according to the detection manner corresponding to the category is possible to perform security monitoring on the human or the vehicle in time and to obtain in real time inventory information of each storage-location in the warehouse storage-location area, thereby improving accuracy of storage-location monitoring and identification.

Figure 6:
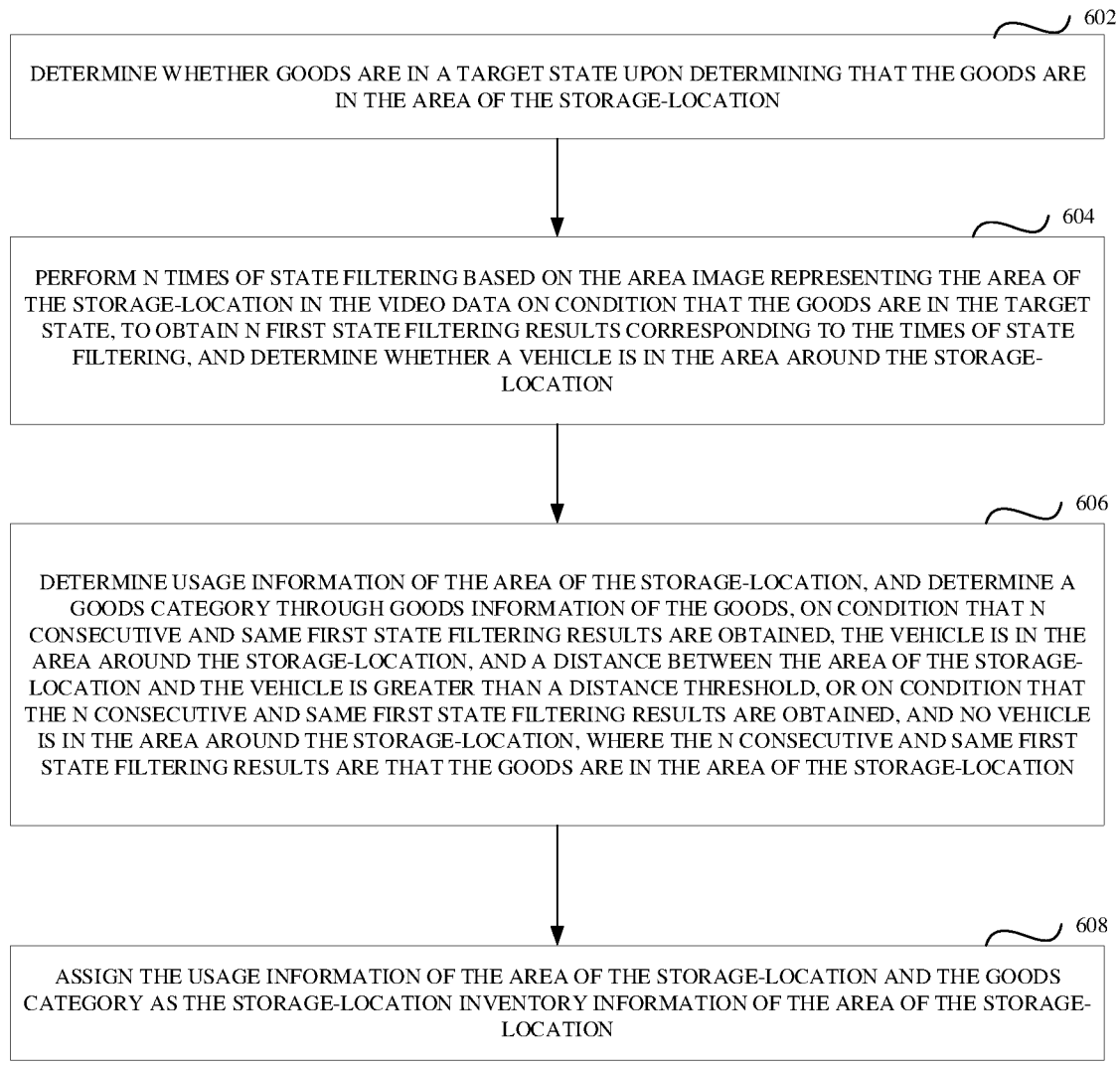
FIG. 6 is a schematic flow chart illustrating determination of storage-location inventory information on condition that a category is goods in an implementation.

In an implementation, as illustrated in FIG. 6, state filtering is performed on the area image representing the area of the storage-location in the video data upon determining that the category of the object appearing in the target image is the goods, and the storage-location inventory information is determined based on the state filtering results as follows.

At block 602, whether goods are in a target state is determined upon determining that the goods are in the area of the storage-location.

Specifically, the computer device detects the area of the storage-location, and determines based on a position relation between the storage-location and the goods whether the goods are in the target state upon determining that the goods are in the area of the storage-location. The target state is that the goods all are located in the area of the storage-location in a preset gesture. The preset gesture may be an upright-and-straight gesture. For example, if the goods are of a square shape, the upright-and-straight gesture is that at least one flat surface of the square goods is parallel to a bottom surface of the warehouse storage-location area.

In an implementation, when the computer device determines that the goods are not in the target state, the horn and the indicator light in the warehouse alarm respectively through sound and light, simultaneously, the alarm text is transmitted to the display interface of the computer device, and the alarm information is transmitted to the RCS.

At block 604, N times of state filtering are performed based on the area image representing the area of the storage-location in the video data on condition that the goods are in the target state, to obtain N first state filtering results corresponding to the times of state filtering, and determine whether a vehicle is in the area around the storage-location.

Specifically, the computer device detects each storage-location based on the table for photographing device and storage-location allocation configuration. When the category is the goods and the goods are in the target state, the computer device sets times of filtering and performs the multiple times of state filtering based on the area image representing the area of the storage-location in the video data, to obtain the multiple first state filtering results, and determine whether a vehicle is in the area around the storage-location.

At block 606, usage information of the area of the storage-location is determined, and a goods category is determined through goods information of the goods, on condition that N consecutive and same first state filtering results are obtained, the vehicle is in the area around the storage-location, and a distance between the area of the storage-location and the vehicle is greater than a distance threshold, or on condition that the N consecutive and same first state filtering results are obtained, and no vehicle is in the area around the storage-location, where the N consecutive and same first state filtering results are that the goods are in the area of the storage-location. The distance between the area of the storage-location and the vehicle refers to a distance between a center of the area of the storage-location and the vehicle.

Specifically, the computer device obtains the N first state filtering results. The computer device determines an occupancy state of the storage-location in the area of the storage-location based on the first state filtering results, and determines the goods category by obtaining the goods information, on condition that the computer device obtains consecutive and same first state filtering results with the same number as the times of filtering and detects that the vehicle is in the area of the storage-location, and the distance between the area of the storage-location and the vehicle is greater than the distance threshold, or on condition that the computer device obtains the N consecutive and same first state filtering results and detects that no vehicle is in the area around the storage-location.

In an implementation, the state evaluation module of the computer device obtains the table for photographing device and storage-location allocation configuration and detects each storage-location in the warehouse storage-location area. When the category is the goods and the goods are in the storage-location, the times of state filtering are set, e.g., 20 times of state filtering are performed within 1 minute. At least 20 area images are obtained based on the area images representing the area of the storage-location in the video data, corresponding first state filtering results are obtained by performing state filtering on each area image, and the computer device detects whether a vehicle is in the area around the storage-location.

For example, it is determined that goods are in the storage-location, and the storage-location is displayed in red on the display interface of the computer device, that is, the red color represents that goods are in the storage-location, on condition that the first state filtering result that goods are in the storage-location appears for the first time for 20 consecutive times, that is, 20 comparing results that goods are in the storage-location are obtained by comparing a filtering result of a previous area image with a filtering result of a current area image, and simultaneously no vehicle is in the area around the storage-location is detected. Alternatively, it is determined that goods are in the storage-location, and the storage-location is displayed in red on the display interface of the computer device, that is, the red color represents that goods are in the storage-location, on condition that the first state filtering result that goods are in the storage-location appears for the first time for 20 consecutive times, that is, 20 comparing results that goods are in the storage-location are obtained by comparing the filtering result of the previous area image with the filtering result of the current area image, simultaneously a vehicle is in the area around the storage-location is detected, and a distance between the vehicle and the area of the storage-location is greater than the distance threshold (for example, the distance threshold is 2 meters, and the distance between the vehicle and the area of the storage-location is greater than 2 meters). The computer device increases the times of filtering until 20 consecutive and same filtering results appear, on condition that the times of filtering are not enough. The computer device determines the goods category by obtaining the goods information.

In an implementation, the state evaluation module of the computer device obtains the table for photographing device and storage-location allocation configuration and detects each storage-location in the warehouse storage-location area. When the category is the goods and the goods are in the storage-location, the times of state filtering are set, e.g., 20 times of state filtering are performed within 1 minute. Corresponding first state filtering results are obtained by performing at least 20 times of state filtering on the current area image based on the current area image representing the area of the storage-location in the video data, and the computer device detects whether a vehicle is in the area around the storage-location.

For example, it is determined that goods are in the storage-location, and the storage-location is displayed in red on the display interface of the computer device, that is, the red color represents that goods are in the storage-location, on condition that the first state filtering result that goods are in the storage-location appears for the first time for 20 consecutive times, that is, 20 comparing results that goods are in the storage-location are obtained by comparing a previous filtering result of the current area image with a current filtering result of the current area image, and simultaneously no vehicle is in the area around the storage-location is detected. Alternatively, it is determined that goods are in the storage-location, and the storage-location is displayed in red on the display interface of the computer device, that is, the red color represents that goods are in the storage-location, on condition that the first state filtering result that goods are in the storage-location appears for the first time for 20 consecutive times, that is, 20 comparing results that goods are in the storage-location are obtained by comparing the previous filtering result of the current area image with the current filtering result of the current area image, simultaneously a vehicle is in the area around the storage-location is detected, and the distance between the vehicle and the area of the storage-location is greater than the distance threshold (for example, the distance threshold is 2 meters, and the distance between the vehicle and the area of the storage-location is greater than 2 meters). The computer device increases times of filtering until 20 consecutive and same filtering results appear, on condition that the times of filtering are not enough. The computer device determines the goods category by obtaining the goods information.

At block 608, the usage information of the area of the storage-location and the goods category are assigned as the storage-location inventory information of the area of the storage-location.

Specifically, the computer device assigns the usage information of the area of the storage-location and the category of goods in the storage-location together as the storage-location inventory information of the area of the storage-location. The computer device stores the storage-location inventory information and outputs the storage-location inventory information to the RCS and a display module of the computer device. For example, the computer device assigns a usage condition of the storage-location and the category of goods in the storage-location in the area of the storage-location as the storage-location inventory information of the area of the storage-location, and transmits the storage-location inventory information to the RCS through HTTP and JSON_RPC, to indicate actions of the warehouse unmanned forklift, where the RCS can connect with the unmanned forklift through the 5G technology or WiFi. An image is input into the display module of the computer device through HTTP and research and publication committee (RPC) library (RPClib) after interface programs of the computer device transmit an image instruction.

In the implementation, the computer device ensures in time whether the goods are safely stored in the storage-location by determining whether the goods are in the target state, upon determining that the goods are in the area of the storage-location. The multiple times of state filtering are performed based on the area image representing the area of the storage-location in the video data, when the goods are in the target state, to obtain the first state filtering results, and determine whether a vehicle is in the area around the storage-location. The usage information of the area of the storage-location is determined, the goods category is determined through the goods information of the goods, and the usage information of the area of the storage-location and the goods category are assigned as the storage-location inventory information of the area of the storage-location, on condition that multiple consecutive and same first state filtering results are obtained, the vehicle is in the area around the storage-location, and the distance between the area of the storage-location and the vehicle is greater than the distance threshold, or on condition that the multiple consecutive and same first state filtering results are obtained, and no vehicle is in the area around the storage-location. Therefore, it is possible to not only obtain in time an occupancy state of each storage-location in the area of the storage-location but also obtain the category of goods stored in the storage-location, thereby obtaining in time inventory information of each storage-location in the warehouse storage-location area and improving accuracy of storage-location monitoring and identification.

In an implementation, determination of the usage information of the area of the storage-location is stopped, on condition that the N consecutive and same first state filtering results are obtained, the vehicle is in the area around the storage-location, and the distance between the area of the storage-location and the vehicle is less than or equal to the distance threshold.

Specifically, the computer device obtains the multiple first state filtering results. The computer device stops determination of the usage information of the area of the storage-location, on condition that the computer device obtains the consecutive and same first state filtering results with the same number as the times of filtering and detects that the vehicle is in the area around the storage-location, and the distance between the area of the storage-location and the vehicle is less than or equal to the distance threshold, where determination of the usage information of the area of the storage-location refers to update an occupancy state of the area of the storage-location.

In an implementation, the state evaluation module of the computer device obtains the table for photographing device and storage-location allocation configuration and detects each storage-location in the warehouse storage-location area. When the category is the goods and the goods are in the storage-location (i.e., a vehicle places the goods into the storage-location), the times of state filtering are set, e.g., 20 times of state filtering are performed within 1 minute. At least 20 area images are obtained based on the area image representing the area of the storage-location in the video data, corresponding first state filtering results are obtained by performing state filtering on each area image, and the distance between the area of the storage-location and the vehicle is less than or equal to the distance threshold (i.e., the vehicle in the area around the storage-location is placing the goods and has not left yet), where the distance threshold can be set by the computer device, e.g., the computer device sets the distance threshold to 2 meters.

When the unmanned forklift enters the area of the storage-location upon receiving a storage instruction of the RCS, where the instruction indicates that the unmanned forklift needs to store the goods to a storage-location identified in blue where no goods are stored, the display interface of the computer device identifies a storage-location where goods are stored in red and identifies the storage-location where no goods are stored in blue. After the unmanned forklift deliveries goods to the area of the storage-location for storage, the computer device performs state filtering on the area of the storage-location. The computer device stops determination of usage information of the area of the storage-location, i.e., the display interface of the computer device stops update of the storage-location, in other words, the display interface of the computer device still displays the storage-location in blue, on condition that a first state filtering result of the storage-location that goods are in the storage-location appears for the first time for 20 consecutive times, and a distance between the unmanned forklift and the area of the storage-location is less than or equal to 2 meters. Meanwhile, the horn and the indicator light in the warehouse alarm respectively through sound and light, simultaneously the alarm text is transmitted to the display interface of the computer device, and the alarm information is transmitted to the RCS, until the distance between the area of the storage-location and the unmanned forklift is greater than 2 meters. Then the computer device restarts update of the storage-location, that is, the storage-location identified in blue is changed to be identified in red.

In an implementation, determination of the usage information of the area of the storage-location is stopped, on condition that the multiple consecutive and same first state filtering results are obtained, the vehicle is in the area around the storage-location, and the distance between the area of the storage-location and the vehicle is less than or equal to the distance threshold. Therefore, the computer device can monitor in time the distance between the vehicle and the area of the storage-location and thus feed back in time an operating state of the vehicle, thereby realizing security monitoring for the vehicle.

In an implementation, multiple times of state filtering are performed based on the area image representing the area of the storage-location in the video data upon determining that no goods are in the area of the storage-location, to obtain M second state filtering results corresponding to the times of state filtering, and determine whether the vehicle is in the area around the storage-location. The usage information of the area of the storage-location is determined, on condition that M consecutive and same second state filtering results are obtained, the vehicle is in the area around the storage-location, and the distance between the area of the storage-location and the vehicle is greater than the distance threshold, or on condition that the M consecutive and same second state filtering results are obtained, and no vehicle is in the area around the storage-location. The usage information is assigned as the storage-location inventory information of the area of the storage-location, where M is a positive integer greater than or equal to 2, and the M consecutive and same second state filtering results are that no goods are in the area of the storage-location.

Specifically, the computer device detects each storage-location based on the table for photographing device and storage-location allocation configuration. Upon determining that no goods are in the area of the storage-location, the computer device sets the times of filtering and performs the multiple times of state filtering based on the area image representing the area of the storage-location in the video data, to obtain multiple second state filtering results, and determine whether a vehicle is in the area around the storage-location. The computer device obtains the multiple second state filtering results. The computer device determines an occupancy state of the storage-location in the area of the storage-location based on the second state filtering results, and assigns the usage information as the storage-location inventory information of the area of the storage-location, on condition that the computer device obtains consecutive and same second state filtering results with the same number as the times of filtering and detects that the vehicle is in the area around the storage-location, and the distance between the area of the storage-location and the vehicle is greater than the distance threshold, or on condition that the computer device obtains multiple consecutive and same second state filtering results and detects that no vehicle is in the area around the storage-location.

In an implementation, the computer device obtains the table for photographing device and storage-location allocation configuration and detects each storage-location in the warehouse storage-location area through the state evaluation module. Upon determining that no goods are in the area of the storage-location, the times of filtering are set, e.g., 20 times of state filtering are performed within 1 minute. At least 20 area images are obtained based on the area images representing the area of the storage-location in the video data, corresponding second state filtering results are obtained by performing state filtering on each area image, and the computer device detects whether a vehicle is in the area around the storage-location.

For example, it is determined that no goods are in the storage-location, and the storage-location is displayed in blue on the display interface of the computer device, that is, the blue color represents that no goods are in the storage-location, on condition that the second state filtering result that no goods are in the storage-location appears for the first time for 20 consecutive times, and no vehicle is in the area around the storage-location, that is, 20 comparing results that no goods are in the storage-location are obtained by comparing a filtering result of a previous area image with a filtering result of a current area image. Alternatively, it is determined that no goods are in the storage-location, and the storage-location is displayed in blue on the display interface of the computer device, that is, the blue color represents that no goods are in the storage-location, on condition that the second state filtering result that no goods are in the storage-location appears for the first time for 20 consecutive times, a vehicle is in the area around the storage-location, and a distance between the vehicle and the area of the storage-location is greater than the distance threshold (e.g., the distance threshold is 2 meters, while the distance between the vehicle and the area of the storage-location is greater than 2 meters), that is, 20 comparing results that no goods are in the storage-location are obtained by comparing the filtering result of the previous area image with the filtering result of the current area image. The computer device increases the times of filtering until 20 consecutive and same filtering results appear, on condition that the times of filtering are not enough.

In an implementation, the computer device obtains the table for photographing device and storage-location allocation configuration and detects each storage-location in the warehouse storage-location area through the state evaluation module. Upon determining that no goods are in the area of the storage-location, the times of state filtering are set, e.g., 20 times of state filtering are performed within 1 minute. Corresponding second state filtering results are obtained by performing at least 20 times of state filtering on the current area image based on the current area image representing the area of the storage-location in the video data, and the computer device detects whether a vehicle is in the area around the storage-location.

For example, it is determined that no goods are in the area of the storage-location, and the storage-location is displayed in blue on the display interface of the computer device, that is, the blue color represents that no goods are in the storage-location, on condition that the second state filtering result that no goods are in the storage-location appears for the first time for 20 consecutive times, and no vehicle is in the area around the storage-location, that is, 20 comparing results that goods are in the storage-location are obtained by comparing a previous filtering result of the current area image with a current filtering result of the current area image. Alternatively, it is determined that no goods are in the area of the storage-location, and the storage-location is displayed in blue on the display interface of the computer device, that is, the blue color represents that no goods are in the storage-location, on condition that the second state filtering result that no goods are in the storage-location appears for the first time for 20 consecutive times, a vehicle is in the area around the storage-location, and a distance between the vehicle and the area of the storage-location is greater than the distance threshold (for example, the distance threshold is 2 meters, and the distance between the vehicle and the area of the storage-location is greater than 2 meters), that is, 20 comparing results that no goods are in the storage-location are obtained by comparing the previous filtering result of the current area image with the current filtering result of the current area image. The computer device increases the times of filtering until 20 consecutive and same filtering results appear, on condition that the times of filtering are not enough.

In the implementation, M times of state filtering are performed based on the area image representing the area of the storage-location in the video data upon determining that no goods are in the area of the storage-location, to obtain the second state filtering results, and determine whether the vehicle is in the area around the storage-location. The usage information of the area of the storage-location is determined, on condition that the M consecutive and same second state filtering results are obtained, the vehicle is in the area around the storage-location, and the distance between the area of the storage-location and the vehicle is greater than the distance threshold, or on condition that the M consecutive and same second state filtering results are obtained, and no vehicle is in the area around the storage-location. The usage information is assigned as the storage-location inventory information of the area of the storage-location. Therefore, it is possible to obtain in time inventory information of each storage-location in the warehouse storage-location area, to indicate a storable storage-location in the warehouse for the warehouse unmanned forklift.

In an implementation, the unmanned forklift drives out of the area of the storage-location upon receiving a goods pickup instruction of the RCS, where the instruction indicates that the unmanned forklift needs to pick up goods from a storage-location identified in red where the goods are stored, and state filtering is performed on the storage-location after the unmanned forklift picks up the goods from the area of the storage-location where the goods are stored. The display interface of the computer device stops update of the storage-location, i.e., the display interface of the computer device still displays the storage-location in red, on condition that a first state filtering result of the storage-location that goods are in the storage-location appears for the first time for 20 consecutive times, and a distance between the unmanned forklift and the area of the storage-location is less than or equal to 2 meters. Meanwhile, the horn and the indicator light in the warehouse alarm respectively through sound and light, simultaneously, the alarm text is transmitted to the display interface of the computer device, and the alarm information is transmitted to the RCS, until the distance between the area of the storage-location and the unmanned forklift is greater than 2 meters. Then the computer device restarts update of the storage-location, that is, the storage-location identified in red is changed to be identified in blue.

In an implementation, determination of the usage information of the area of the storage-location is stopped, on condition that the multiple consecutive and same first state filtering results are obtained, the vehicle is in the area around the storage-location, and the distance between the area of the storage-location and the vehicle is less than or equal to the distance threshold. Therefore, the computer device can monitor in time the distance between the vehicle and the area of the storage-location and thus feed back in time an operating state of the vehicle, thereby realizing security monitoring for the vehicle.

Figure 7:
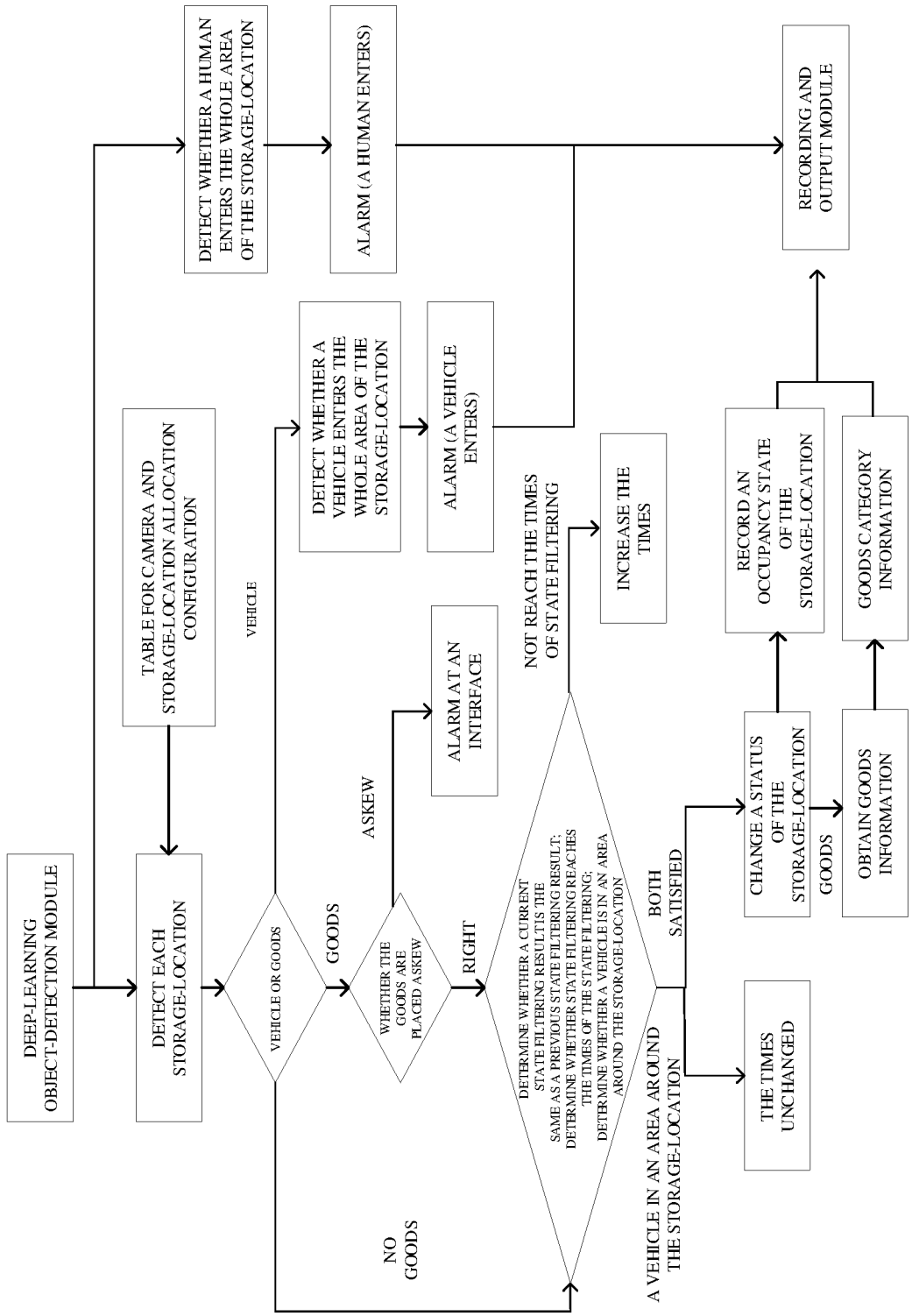
FIG. 7 is a schematic flow chart illustrating a method for detecting a status of an object in a warehouse storage-location area in an implementation.

In order to facilitate clearer understanding of a solution for detecting a status of an object in a warehouse storage-location area, the following will provide a relatively detailed implementation for illustration. For the solution for detecting a status of an object in a warehouse storage-location area, specifically as illustrated in FIG. 7, a monitoring system can be understood as a computer device. The monitoring system performs state detection by obtaining a category of an object in the warehouse storage-location area, and detects respectively the warehouse storage-location area and an area of a storage-location first. Upon detecting that a human enters the whole warehouse storage-location area, a horn and an indicator light in the warehouse alarm respectively through sound and light, simultaneously, an alarm text is transmitted to a display interface of the monitoring system, and alarm information is transmitted to an RCS, until the human leaves the warehouse storage-location area. The monitoring system determines whether a vehicle or goods is in each storage-location with a table for camera and storage-location allocation configuration, when detecting each storage-location in the warehouse storage-location area. The table for camera and storage-location allocation configuration belongs to the above table for photographing device and storage-location allocation configuration and includes a correspondence between camera identifiers and storage-locations, where the camera identifier for example includes a product sequence number of a camera, or the like. When a vehicle appears at the storage-location, the horn and the indicator light in the warehouse alarm, the alarm text is transmitted to the display interface of the monitoring system, and the alarm information is transmitted to the RCS, until that the vehicle leaves the storage-location. When goods are in the storage-location, whether all of the goods in the storage-location are in the area of the storage-location is determined first. If all of the goods are not in the area of the storage-location, the monitoring system can alarm through the display interface, can also alarm through the horn and indicator light, and transmit the alarm information to the RCS, to ensure that the goods are placed in a safe state. The monitoring system sets times of filtering, and determines respectively whether a current state filtering result is the same as a previous state filtering result, whether state filtering reaches the times of the state filtering, or whether a vehicle appears during filtering determination, on condition that goods are in the storage-location and all of the goods are in the area of the storage-location, or on condition that no goods are in the storage-location. The status of the storage-location is changed and an occupancy state of the storage-location is recorded, on condition that consecutive and same state filtering results appear and the times of filtering are reached, a vehicle is in an area around the storage-location, and a distance between the area of the storage-location and the vehicle is greater than a distance threshold, or on condition that consecutive and same state filtering results appear and the times of filtering are reached, and no vehicle is in the area around the storage-location. The monitoring system determines goods category information by obtaining goods information in the storage-location, if goods are in the storage-location. Therefore, when goods are in the storage-location, the monitoring system records and outputs the occupancy state of the storage-location and the goods category information to the RCS, to indicate actions of a warehouse unmanned forklift. When no goods are in the storage-location, the monitoring system records and outputs the occupancy condition of the storage-location to the RCS, to indicate actions of the warehouse unmanned forklift. Therefore, the monitoring system can detect a status of each object according to a category of each object and thus obtain in time inventory information of each storage-location in the warehouse storage-location area, thereby improving accuracy of storage-location monitoring and identification.

Figure 8:
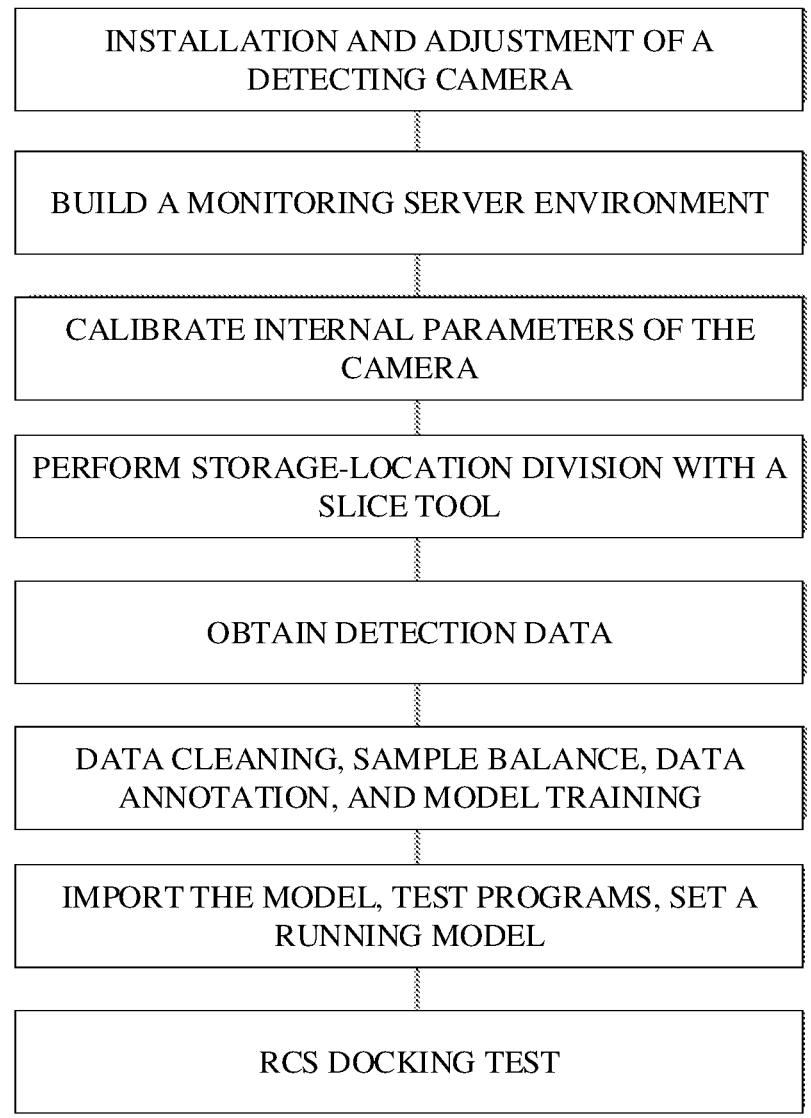
FIG. 8 is a schematic flow chart illustrating preliminary commissioning of a method for warehouse storage-location monitoring in an implementation.

In order to facilitate clearer understanding of the technical solutions of the disclosure, the following will provide a relatively detailed implementation for illustration. A preliminary commissioning of the monitoring system is performed first when the warehouse storage-location is monitored, where the monitoring system can be understood as the computer device. Specifically as illustrated in FIG. 8, the preliminary commissioning refers to installation and adjustment of a detecting camera (i.e., the photographing device), building a monitoring server environment, calibrating internal parameters of the camera, performing storage-location division on the warehouse storage-location area with a slice tool, obtaining detection data through detection, obtaining a trained category detection model by performing data cleaning, sample balance, data annotation, and model training on the detection data, importing the model, inputting test programs, setting a running model, and finally performing a docking test by connecting the RCS with the monitoring system. The detection data collected includes: a single human, multiple humans, a separate vehicle, multiple vehicles, vehicles at all angles and positions, a manned forklift, a human besides a vehicle, separate goods, various goods (i.e., goods in various categories, within various distances, and at all angles and positions), a vehicle being carrying goods, a vehicle besides goods, a vehicle being carrying goods and a human besides the vehicle, a human and a vehicle each besides goods, a human operating on a forklift, or a human standing on a pallet (if there has a pallet). A commissioned monitoring system is applied in the environment as illustrated in FIG. 1 when the docking test is complete.

Figure 9:
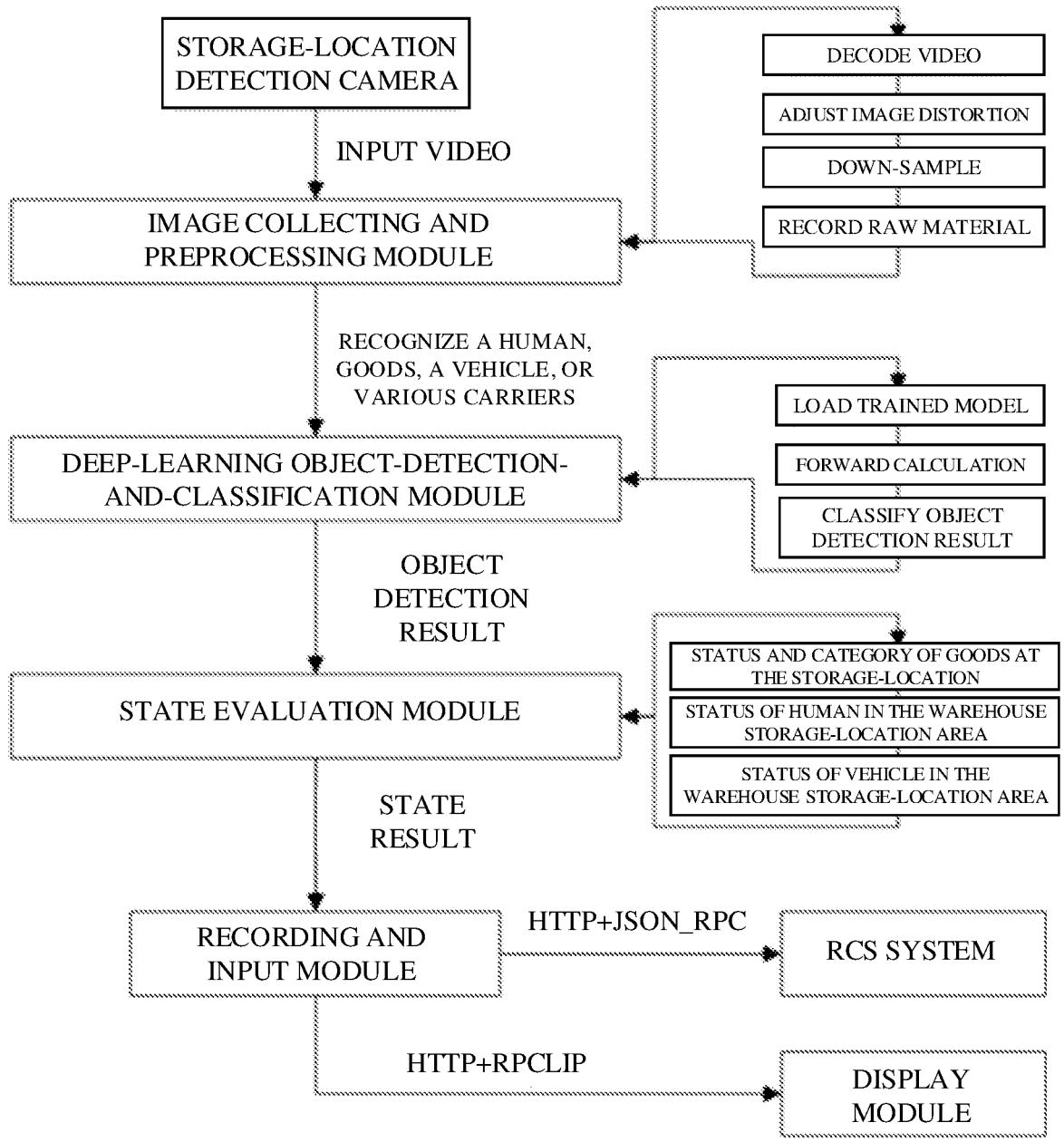
FIG. 9 is a schematic flow chart illustrating a method for warehouse storage-location monitoring in another implementation.

For the solution for warehouse storage-location monitoring, specifically as illustrated in FIG. 9, the monitoring programs of the monitoring system continuously obtain the video flow from a storage-location detection camera of the photographing device, where the computer device can be the monitoring system. The target image is obtained by inputting the video flow to the image processing module for processing, where the image processing module obtains the decoded image by decoding the inputted video, adjusts the distortion of the decoded image, and then down-samples, to reduce the calculation amount and store the video flow of a raw material. The category of each object appearing in the target image is obtained by inputting the target image to the deep-learning object-detection-and-classification module for division, where the trained category detection model is loaded first, and the category of each object is obtained by inputting the target image to the category detection model for forward calculation. The category of each object is inputted to the state evaluation module, and a status and a category of each of goods at the storage-location, a status of a human in the warehouse storage-location area, and a status of a vehicle in the warehouse storage-location area obtained are assigned as a state result. The state result finally is recorded to the monitoring system, and the monitoring system outputs the state result to the RCS and an interface display system through HTTP+JSON_RPC, and if the interface programs transmit an instruction to obtain an image, the monitoring system inputs the image to the display module of the monitoring system through HTTP+RPClip, thereby realizing real-time monitoring for the warehouse storage-location and further improving accuracy of warehouse storage-location identification.

The interface programs can be deployed on a storage-location monitoring server, a server of a client, a tablet computer, or the like which has a strong portability, since the interface display module (i.e., the interface system) transmits images and state information through a network. Through the display programs of the interface display module, an overview map of photographing devices can be clicked, or a fixed camera identifier number can be input, such that an image can be pre-viewed by selecting a certain fixed camera. The interface display module can also be remotely controlled to complete a part function of configuration.

Figure 10:
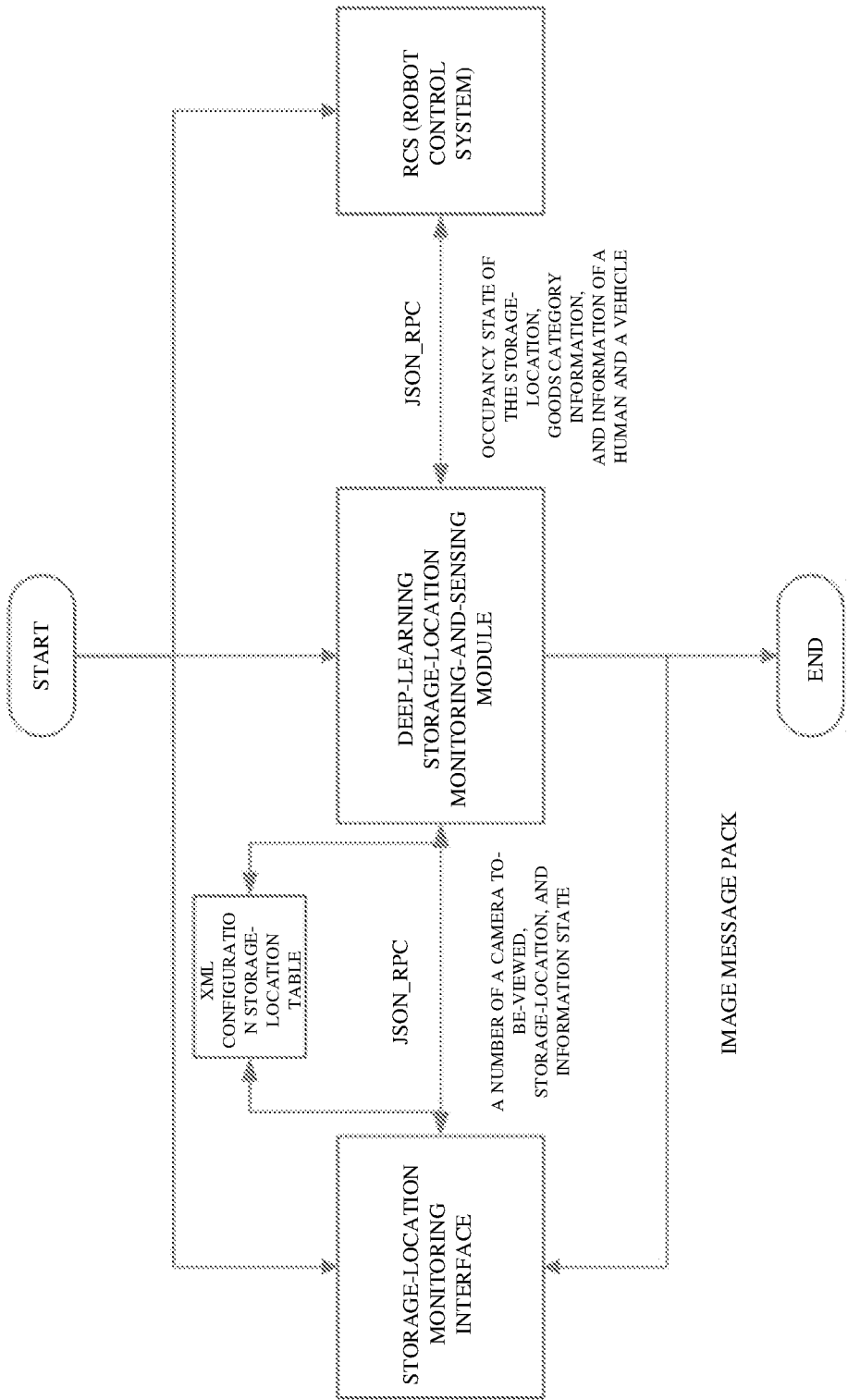
FIG. 10 is a diagram illustrating data flow of a method for warehouse storage-location monitoring in an implementation.

In the above implementations, for circulation of the video data in a storage-location monitoring interface (i.e., the interface display module) of the monitoring system, a deep-learning storage-location monitoring-and-sensing module of the monitoring system, and the RCS, specifically refer to FIG. 10, where a bidirectional arrow in the drawing represents bidirectional circulation of data, and an Xml configuration storage-location table corresponds to the table for camera and storage-location allocation configuration, that is, the Xml configuration storage-location table contains a coordinate, internal and external parameters, or storage-location information corresponding to each camera, or the like. The deep-learning storage-location monitoring-and-sensing module corresponds to the monitoring system, and the storage-location monitoring interface corresponds to the display module of the monitoring system. The deep-learning storage-location monitoring-and-sensing module communicates with the display interface through JSON_RPC and RPClib. JSON_RPC is a public interface, i.e., the deep-learning storage-location monitoring-and-sensing module can communicate with the interface programs or the RCS through JSON_RPC, and JSON_RPC mainly transmits a status of a storage-location, a status of a human, or a status of a vehicle. The image is transmitted to the interface programs by using RPClib message pack since JSON_RPC cannot transmit an image.

For circulation of the video data in the storage-location monitoring interface (i.e., the interface display module) of the monitoring system, the deep-learning storage-location monitoring-and-sensing module, and the RCS, where the monitoring system can be understood as the computer device, the storage-location monitoring interface may transmit a number of a camera (i.e., the photographing device) to-be-viewed to the deep-learning storage-location monitoring-and-sensing module first, while the deep-learning storage-location monitoring-and-sensing module may transmit an image to the storage-location monitoring interface. The interface programs can control the sensing module to complete works such as calibration, data collection, log recording, or the like, and can also read and write the Xml storage-location table. Data between the deep-learning storage-location monitoring-and-sensing module and the RCS can flow in both directions, the deep-learning storage-location monitoring-and-sensing module may transmit a status to the RCS, the RCS can also individually inquiry positions of a human and a vehicle, the deep-learning storage-location monitoring-and-sensing module does not update or initialize, or the like.

It should be understood that although the various steps in the flowchart of FIG. 2, FIGS. 4-7, and FIGS. 9-10 are shown in sequence according to the arrows, these steps are not necessarily executed in the sequence shown by the arrows. Unless explicitly stated herein, the execution of these steps is not strictly limited to the order, and the steps may be executed in other orders. Moreover, at least a part of the steps in FIG. 2, FIGS. 4-7, and FIGS. 9-10 may include multiple steps or multiple stages, and these steps or stages are not necessarily executed at the same time, but may be executed at different times, and the execution sequence of these steps or stages is also It does not have to be performed sequentially, but may be performed alternately or alternately with other steps or at least a portion of the steps or stages within the other steps.

Figure 11:
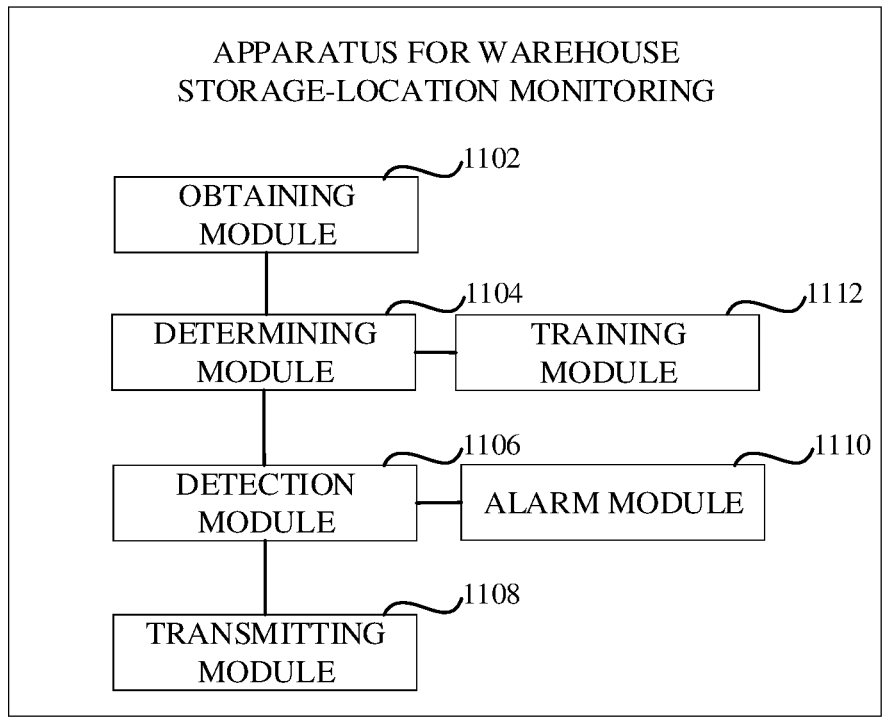
FIG. 11 is a structural block diagram illustrating an apparatus for warehouse storage-location monitoring in an implementation.

In an implementation, as illustrated in FIG. 11, an apparatus for warehouse storage-location monitoring is provided. The apparatus includes an obtaining module 1102, a determining module 1104, a detection module 1106, and a transmitting module 1108.

The obtaining module 1102 is configured to obtain video data of a warehouse storage-location area, and obtain a target image corresponding to the warehouse storage-location area based on the video data, where the warehouse storage-location area includes an area of a storage-location and an area around the storage-location.

The determining module 1104 is configured to detect the target image based on a category detection model, to determine a category of each object appearing in the target image, where the category includes at least one of: human, vehicle, or goods.

The detection module 1106 is configured to obtain a detection result by detecting a status of each object based on the category of each object, where the detection result includes at least one of: whether the human enters the warehouse storage-location area, vehicle status information, or storage-location inventory information.

The transmitting module 1108 is configured to transmit the detection result to a warehouse scheduling system, where the detection result is used for the warehouse scheduling system to monitor the warehouse storage-location area.

In an implementation, the obtaining module 1102 is specifically configured to: obtain the video data of the warehouse storage-location area; obtain a decoded image corresponding to the video data by decoding the video data; obtain an aligned image by aligning the decoded image; and obtain the target image corresponding to the warehouse storage-location area by down-sampling the aligned image.

In an implementation, the determining module 1104 is specifically configured to: obtain an image feature corresponding to the target image by performing feature extraction on the target image based on the category detection model; and determine the category of each object appearing in the target image according to the image feature.

In an implementation, the detection module 1106 is specifically configured to: transmit alarm information, upon determining that a category of an object appearing in the target image is the vehicle and determining that the vehicle enters the area around the storage-location; perform state filtering on an area image representing the area of the storage-location in the video data upon determining that a category of an object appearing in the target image is the goods, and determining the storage-location inventory information based on the area image subjected to state filtering; and transmit the alarm information, upon determining that a category of an object appearing in the target image is the human and determining that the human enters the area around the storage-location.

In an implementation, the detection module 1106 is configured to: determine whether goods are in a target state upon determining that the goods are in the area of the storage-location, where the target state is that the goods all are located in the area of the storage-location; perform N times of state filtering based on the area image representing the area of the storage-location in the video data on condition that the goods are in the target state, to obtain N first state filtering results corresponding to the times of state filtering, and determine whether a vehicle is in the area around the storage-location, where N is a positive integer greater than or equal to 2; determine usage information of the area of the storage-location, and determine a goods category through goods information of the goods, on condition that N consecutive and same first state filtering results are obtained, the vehicle is in the area around the storage-location, and a distance between the area of the storage-location and the vehicle is greater than a distance threshold, or on condition that the N consecutive and same first state filtering results are obtained, and no vehicle is in the area around the storage-location, where the N consecutive and same first state filtering results are that the goods are in the area of the storage-location; and assign the usage information of the area of the storage-location and the goods category as the storage-location inventory information.

In an implementation, the detection module 1106 configured to perform N times of state filtering based on the area image representing the area of the storage-location in the video data, to obtain the N first state filtering results corresponding to the times of state filtering is specifically configured to: extract N area images representing the area of the storage-location based on the video data; and obtain the N first state filtering results by performing state filtering on each of the N the area images.

In an implementation, the detection module 1106 configured to perform N times of state filtering based on the area image representing the area of the storage-location in the video data, to obtain the N first state filtering results corresponding to the times of state filtering is specifically configured to: extract a current area image representing the area of the storage-location based on the video data; and obtain the N first state filtering results by performing N times of state filtering on the current area image.

In an implementation, the detection module 1106 is further configured to stop determination of the usage information of the area of the storage-location, on condition that the N consecutive and same first state filtering results are obtained, the vehicle is in the area around the storage-location, and the distance between the area of the storage-location and the vehicle is less than or equal to the distance threshold.

In an implementation, the apparatus for warehouse storage-location monitoring is further includes an alarm module 1110. The alarm module 1110 is configured to generate the alarm information on condition that the N consecutive and same first state filtering results are obtained, the vehicle is in the area around the storage-location, and the distance between the area of the storage-location and the vehicle is less than or equal to the distance threshold.

In an implementation, the detection module 1106 is further configured to: perform M times of state filtering based on the area image representing the area of the storage-location in the video data upon determining that no goods are in the area of the storage-location, to obtain M second state filtering results corresponding to the times of state filtering, and determine whether the vehicle is in the area around the storage-location, where M is a positive integer greater than or equal to 2; determine the usage information of the area of the storage-location, on condition that M consecutive and same second state filtering results are obtained, the vehicle is in the area around the storage-location, and the distance between the area of the storage-location and the vehicle is greater than the distance threshold, or on condition that the M consecutive and same second state filtering results are obtained, and no vehicle is in the area around the storage-location; and assign the usage information as the storage-location inventory information of the area of the storage-location, where the M consecutive and same second state filtering results are that no goods are in the area of the storage-location.

In an implementation, the detection module 1106 configured to perform M times of state filtering based on the area image representing the area of the storage-location in the video data, to obtain the M second state filtering results corresponding to the times of state filtering is specifically configured to: extract M area images representing the area of the storage-location based on the video data; and obtain the M second state filtering results by performing state filtering on each of the M the area images.

In an implementation, the detection module 1106 configured to obtain the M consecutive and same second state filtering results is specifically configured to: obtain the M consecutive second state filtering results by comparing a filtering result of a previous area image with a filtering result of a current area image until filtering results of any two adjacent area images in the M second state filtering results are compared; and obtain the M consecutive and same second state filtering results on condition that the M second state filtering results are the same.

In an implementation, the detection module 1106 configured to perform M times of state filtering based on the area image representing the area of the storage-location in the video data, to obtain the M second state filtering results corresponding to the times of state filtering is specifically configured to: extract a current area image representing the area of the storage-location based on the video data; and obtain the M second state filtering results by performing M times of state filtering on the current area image.

In an implementation, the apparatus for warehouse storage-location monitoring is further includes a training module 1112. The training module 1112 is configured to: collect detection data, where the detection data includes image data corresponding to multiple scenarios, and the multiple scenarios include: a single human, multiple humans, a separate vehicle, multiple vehicles, vehicles at all angles and positions, a manned forklift, a human besides a vehicle, separate goods, various goods, a vehicle being carrying goods, a vehicle besides goods, a vehicle being carrying goods and a human besides the vehicle, a human and a vehicle each besides goods, a human operating on a forklift, or a human standing on a pallet; and train the category detection model based on the detection data, to obtain a trained category detection model.

For the specific definition of the apparatus for warehouse storage-location monitoring, please refer to the above definition of the method for warehouse storage-location monitoring, which will not be repeated here. Each module in the above-mentioned apparatus for warehouse storage-location monitoring can be implemented in whole or in part by software, hardware, and combinations thereof. The above modules can be embedded in or independent of a processor in the computer device in the form of hardware, or stored in a memory in the computer device in the form of software, so that the processor can invoke and execute the operations corresponding to the above modules.

Figure 12:
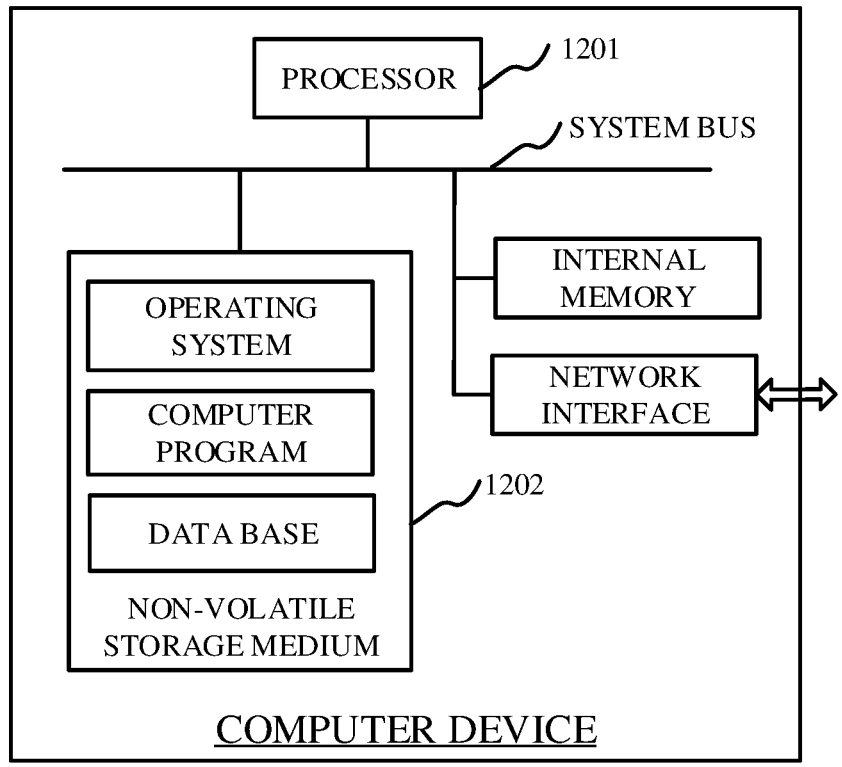
FIG. 12 is an internal structural diagram illustrating a computer device in an implementation.

In an implementation, a computer device is provided. The computer device may be a server, and an internal structural diagram thereof is illustrated in FIG. 12. The computer device includes a processor 1201 coupled via a system bus, a memory, and a network interface. The processor 1201 of the computer device is configured to provide computing and control functions. The memory of the computer device includes a non-volatile storage medium 1202 or an internal memory. The non-volatile storage medium 1202 is configured to store an operating system, a computer program, and a data base. The internal memory is configured to provide an environment for running of the operating system and the computer program in the non-volatile storage medium 1202. The data base of the computer device is configured to store determining data of material-cage stacking. The network interface of the computer device is configured to communicate with an external terminal through network connection. The computer program is executed by the processor 1201 to implement a method for warehouse storage-location monitoring.

Those of ordinary skill in the art can understand that the structure illustrated in FIG. 12 is only a block diagram of a part of the structure related to the solution of the present disclosure, and does not constitute a limitation on the computer device to which the solution of the present disclosure is applied. Include more or fewer components than illustrated in the figures, or combine certain components, or have a different arrangement of components.

In one implementation, a computer device is provided and includes a memory and a processor. The memory is configured to store computer programs which, when executed by the processor, enable the processor to execute the operations in the foregoing method implementations.

In one implementation, a computer-readable storage medium is provided. The computer-readable storage medium is configured to store computer programs which, when executed by a processor, enable the processor to execute the operations in the foregoing method implementations.

Those of ordinary skill in the art can understand that all or part of the processes in the methods of the above implementations can be implemented by instructing relevant hardware through a computer program. The computer program can be stored in a non-volatile computer-readable storage medium, the computer program, when executed, may include the processes of the above-mentioned method implementations. Any reference to memory, storage, data base or other media used in the various implementations provided in this disclosure may include at least one of a non-volatile memory or a volatile memory. The non-volatile memory may include a read-only memory (ROM), a magnetic tape, a floppy disk, a flash memory, an optical memory, or the like. The volatile memory may include a random access memory (RAM) or external cache memory. By way of illustration and not limitation, the RAM may be in various forms, such as a static random access memory (SRAM), a dynamic random access memory (DRAM), or the like.

The technical features of the above implementations can be combined arbitrarily. In order to make the description simple, all possible combinations of the technical features in the above implementations are not described. However, as long as there is no contradiction in the combination of these technical features, it is considered to be the range described in this specification.

The above-mentioned implementations only represent several implementations of the present disclosure, and the descriptions thereof are relatively specific and detailed, but should not be understood as a limitation on the scope of the invention patent. It should be noted that, for those of ordinary skill in the art, without departing from the concept of the present disclosure, several modifications and improvements can be made, which all belong to the protection scope of the present disclosure. Therefore, the scope of protection of the present disclosure patent shall be subject to the appended claims.

What is claimed is:

1. A method for warehouse storage-location monitoring, comprising:
   obtaining video data of a warehouse storage-location area, and obtaining a target image corresponding to the warehouse storage-location area based on the video data, the warehouse storage-location area comprising an area of a storage-location and an area around the storage-location;
   detecting the target image based on a category detection model, to determine a category of each object appearing in the target image, the category comprising at least one of: human, vehicle, or goods;
   obtaining a detection result by detecting a status of each object based on the category of each object, the detection result comprising at least one of: whether the human enters the warehouse storage-location area, vehicle status information, or storage-location inventory information; and
   transmitting the detection result to a warehouse scheduling system, the detection result being used for the warehouse scheduling system to monitor the warehouse storage-location area;
   wherein obtaining the detection result by detecting the status of each object based on the category of each object comprises:
      transmitting alarm information, upon determining that a category of an object appearing in the target image is the vehicle and determining that the vehicle enters the area around the storage-location;
      performing state filtering on an area image representing the area of the storage-location in the video data upon determining that a category of an object appearing in the target image is the goods, and determining the storage-location inventory information based on the area image subjected to state filtering; and
      transmitting the alarm information, upon determining that a category of an object appearing in the target image is the human and determining that the human enters the area around the storage-location;
   wherein performing state filtering on the area image representing the area of the storage-location in the video data upon determining that the category of the object appearing in the target image is the goods, and determining the storage-location inventory information based on the area image subjected to state filtering, comprises:
      determining whether goods are in a target state upon determining that the goods are in the area of the storage-location, wherein the target state is that the goods all are located in the area of the storage-location in a preset gesture;
      performing N times of state filtering based on the area image representing the area of the storage-location in the video data on condition that the goods are in the target state, to obtain N first state filtering results corresponding to the times of state filtering, and determine whether a vehicle is in the area around the storage-location, wherein N is a positive integer greater than or equal to 2;
      determining usage information of the area of the storage-location, and determining a goods category through goods information of the goods, on condition that N consecutive and same first state filtering results are obtained, the vehicle is in the area around the storage-location, and a distance between the area of the storage-location and the vehicle is greater than a distance threshold, or on condition that the N consecutive and same first state filtering results are obtained, and no vehicle is in the area around the storage-location, wherein the N consecutive and same first state filtering results are that the goods are in the area of the storage-location; and
      assigning the usage information of the area of the storage-location and the goods category as the storage-location inventory information.

2. The method of claim 1, wherein obtaining the video data of the warehouse storage-location area, and obtaining the target image corresponding to the warehouse storage-location area based on the video data comprises:
   obtaining the video data of the warehouse storage-location area;
   obtaining a decoded image corresponding to the video data by decoding the video data;
   obtaining an aligned image by aligning the decoded image; and
   obtaining the target image corresponding to the warehouse storage-location area by down-sampling the aligned image.

3. The method of claim 1, wherein detecting the target image based on the category detection model, to determine the category of each object appearing in the target image comprises:
   obtaining an image feature corresponding to the target image by performing feature extraction on the target image based on the category detection model; and
   determining the category of each object appearing in the target image according to the image feature.

4. The method of claim 1, wherein performing N times of state filtering based on the area image representing the area of the storage-location in the video data, to obtain the N first state filtering results corresponding to the times of state filtering comprises:
   extracting N area images representing the area of the storage-location based on the video data; and
   obtaining the N first state filtering results by performing state filtering on each of the N the area images.

5. The method of claim 1, wherein performing N times of state filtering based on the area image representing the area of the storage-location in the video data, to obtain the N first state filtering results corresponding to the times of state filtering comprises:
   extracting a current area image representing the area of the storage-location based on the video data; and
   obtaining the N first state filtering results by performing N times of state filtering on the current area image.

6. The method of claim 1, further comprising:
   stopping determination of the usage information of the area of the storage-location, on condition that the N consecutive and same first state filtering results are obtained, the vehicle is in the area around the storage-location, and the distance between the area of the storage-location and the vehicle is less than or equal to the distance threshold.

7. The method of claim 1, further comprising:
generating the alarm information on condition that the N consecutive and same first state filtering results are obtained, the vehicle is in the area around the storage-location, and the distance between the area of the storage-location and the vehicle is less than or equal to the distance threshold.

8. The method of claim 1, further comprising:
performing M times of state filtering based on the area image representing the area of the storage-location in the video data upon determining that no goods are in the area of the storage-location, to obtain M second state filtering results corresponding to the times of state filtering, and determine whether the vehicle is in the area around the storage-location, wherein M is a positive integer greater than or equal to 2;
determining the usage information of the area of the storage-location, on condition that M consecutive and same second state filtering results are obtained, the vehicle is in the area around the storage-location, and the distance between the area of the storage-location and the vehicle is greater than the distance threshold, or on condition that the M consecutive and same second state filtering results are obtained, and no vehicle is in the area around the storage-location; and
assigning the usage information as the storage-location inventory information of the area of the storage-location, wherein the M consecutive and same second state filtering results are that no goods are in the area of the storage-location.

9. The method of claim 8, wherein performing M times of state filtering based on the area image representing the area of the storage-location in the video data, to obtain the M second state filtering results corresponding to the times of state filtering comprises:
extracting M area images representing the area of the storage-location based on the video data; and
obtaining the M second state filtering results by performing state filtering on each of the M the area images.

10. The method of claim 9, wherein obtaining the M consecutive and same second state filtering results comprises:
obtaining the M consecutive second state filtering results by comparing a filtering result of a previous area image with a filtering result of a current area image until filtering results of any two adjacent area images in the M second state filtering results are compared; and
obtaining the M consecutive and same second state filtering results on condition that the M second state filtering results are the same.

11. The method of claim 8, wherein performing M times of state filtering based on the area image representing the area of the storage-location in the video data, to obtain the M second state filtering results corresponding to the times of state filtering comprises:
extracting a current area image representing the area of the storage-location based on the video data; and
obtaining the M second state filtering results by performing M times of state filtering on the current area image.

12. The method of claim 1, further comprising:
collecting detection data, wherein the detection data comprises image data corresponding to a plurality of scenarios, and the plurality of scenarios comprise: a single human, a plurality of humans, a separate vehicle, a plurality of vehicles, vehicles at all angles and positions, a manned forklift, a human besides a vehicle, separate goods, various goods, a vehicle being carrying goods, a vehicle besides goods, a vehicle being carrying goods and a human besides the vehicle, a human and a vehicle each besides goods, a human operating on a forklift, or a human standing on a pallet; and
training the category detection model based on the detection data, to obtain a trained category detection model.

13. The method of claim 1, wherein the area around the storage-location is an area with an adjustable position relative to the area of the storage-location, and an adjustable range of the position of the area around the storage-location is in a preset range.

14. A computer device, comprising:
a processor; and
a memory configured to store computer programs which, when executed by the processor, enable the processor to:
obtain video data of a warehouse storage-location area, and obtain a target image corresponding to the warehouse storage-location area based on the video data, the warehouse storage-location area comprising an area of a storage-location and an area around the storage-location;
detect the target image based on a category detection model, to determine a category of each object appearing in the target image, the category comprising at least one of: human, vehicle, or goods;
obtain a detection result by detecting a status of each object based on the category of each object, the detection result comprising at least one of: whether the human enters the warehouse storage-location area, vehicle status information, or storage-location inventory information; and
transmit the detection result to a warehouse scheduling system, the detection result being used for the warehouse scheduling system to monitor the warehouse storage-location area;
wherein when executing the computer programs, the processor configured to obtain the detection result by detecting the status of each object based on the category of each object is configured to:
transmit alarm information, upon determining that a category of an object appearing in the target image is the vehicle and determining that the vehicle enters the area around the storage-location;
perform state filtering on an area image representing the area of the storage-location in the video data upon determining that a category of an object appearing in the target image is the goods, and determining the storage-location inventory information based on the area image subjected to state filtering; and
transmit the alarm information, upon determining that a category of an object appearing in the target image is the human and determining that the human enters the area around the storage-location;
wherein when executing the computer programs, the processor configured to perform state filtering on the area image representing the area of the storage-location in the video data upon determining that the category of the object appearing in the target image is the goods, and determine the storage-location inventory information based on the area image subjected to state filtering is configured to:
  determine whether goods are in a target state upon determining that the goods are in the area of the storage-location, wherein the target state is that the goods all are located in the area of the storage-location in a preset gesture;
  perform N times of state filtering based on the area image representing the area of the storage-location in the video data on condition that the goods are in the target state, to obtain N first state filtering results corresponding to the times of state filtering, and determine whether a vehicle is in the area around the storage-location, wherein N is a positive integer greater than or equal to 2;
  determine usage information of the area of the storage-location, and determining a goods category through goods information of the goods, on condition that N consecutive and same first state filtering results are obtained, the vehicle is in the area around the storage-location, and a distance between the area of the storage-location and the vehicle is greater than a distance threshold, or on condition that the N consecutive and same first state filtering results are obtained, and no vehicle is in the area around the storage-location, wherein the N consecutive and same first state filtering results are that the goods are in the area of the storage-location; and
  assign the usage information of the area of the storage-location and the goods category as the storage-location inventory information.

15. The computer device of claim 14, wherein when executing the computer programs, the processor configured to obtain the video data of the warehouse storage-location area and obtain the target image corresponding to the warehouse storage-location area based on the video data is configured to:
  obtain the video data of the warehouse storage-location area;
  obtain a decoded image corresponding to the video data by decoding the video data;
  obtain an aligned image by aligning the decoded image; and
  obtain the target image corresponding to the warehouse storage-location area by down-sampling the aligned image.

16. The computer device of claim 14, wherein when executing the computer programs, the processor configured to detect the target image based on the category detection model, to determine the category of each object appearing in the target image is configured to:
  obtain an image feature corresponding to the target image by performing feature extraction on the target image based on the category detection model; and
  determine the category of each object appearing in the target image according to the image feature.

17. A non-transitory computer-readable storage medium configured to store computer programs which, when executed by a processor, enable the processor to:
  obtain video data of a warehouse storage-location area, and obtain a target image corresponding to the warehouse storage-location area based on the video data, the warehouse storage-location area comprising an area of a storage-location and an area around the storage-location;
  detect the target image based on a category detection model, to determine a category of each object appearing in the target image, the category comprising at least one of: human, vehicle, or goods;
  obtain a detection result by detecting a status of each object based on the category of each object, the detection result comprising at least one of: whether the human enters the warehouse storage-location area, vehicle status information, or storage-location inventory information; and
  transmit the detection result to a warehouse scheduling system, the detection result being used for the warehouse scheduling system to monitor the warehouse storage-location area;
  wherein when executing the computer programs, the processor configured to obtain the detection result by detecting the status of each object based on the category of each object is configured to:
    transmit alarm information, upon determining that a category of an object appearing in the target image is the vehicle and determining that the vehicle enters the area around the storage-location;
    perform state filtering on an area image representing the area of the storage-location in the video data upon determining that a category of an object appearing in the target image is the goods, and determining the storage-location inventory information based on the area image subjected to state filtering; and
    transmit the alarm information, upon determining that a category of an object appearing in the target image is the human and determining that the human enters the area around the storage-location;
  wherein when executing the computer programs, the processor configured to perform state filtering on the area image representing the area of the storage-location in the video data upon determining that the category of the object appearing in the target image is the goods, and determine the storage-location inventory information based on the area image subjected to state filtering is configured to:
    determine whether goods are in a target state upon determining that the goods are in the area of the storage-location, wherein the target state is that the goods all are located in the area of the storage-location in a preset gesture;
    perform N times of state filtering based on the area image representing the area of the storage-location in the video data on condition that the goods are in the target state, to obtain N first state filtering results corresponding to the times of state filtering, and determine whether a vehicle is in the area around the storage-location, wherein N is a positive integer greater than or equal to 2;
    determine usage information of the area of the storage-location, and determining a goods category through goods information of the goods, on condition that N consecutive and same first state filtering results are obtained, the vehicle is in the area around the storage-location, and a distance between the area of the storage-location and the vehicle is greater than a distance threshold, or on condition that the N consecutive and same first state filtering results are obtained, and no vehicle is in the area around the storage-location, wherein the N consecutive and same first state filtering results are that the goods are in the area of the storage-location; and assign the usage information of the area of the storage-location and the goods category as the storage-location inventory information.

\* \* \* \* \*